US009408238B2

(12) United States Patent
Nambord et al.

(10) Patent No.: US 9,408,238 B2
(45) Date of Patent: Aug. 2, 2016

(54) REMOVABLE CONDUCTIVE LAYER THAT SHIELDS AND/OR SHORTS NODES OF AN NFC CIRCUIT TO CONTROL TRANSMISSIONS THEREFROM

(71) Applicant: Sony Corporation, Tokyo (JP)

(72) Inventors: Magnus Nambord, Lund (SE); Emil Hansson, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/468,911

(22) Filed: Aug. 26, 2014

(65) Prior Publication Data

US 2015/0245385 A1      Aug. 27, 2015

Related U.S. Application Data

(60) Provisional application No. 61/942,718, filed on Feb. 21, 2014.

(51) Int. Cl.
| | |
|---|---|
| *H04B 7/00* | (2006.01) |
| *H04W 74/08* | (2009.01) |
| *H04B 5/00* | (2006.01) |
| *H04B 5/02* | (2006.01) |

(52) U.S. Cl.
CPC ........... *H04W 74/085* (2013.01); *H04B 5/0031* (2013.01); *H04B 5/0037* (2013.01); *H04B 5/0081* (2013.01); *H04B 5/02* (2013.01)

(58) Field of Classification Search
CPC ....... H04B 5/0031; H04B 5/0037; H04B 5/02
USPC .................. 455/41.1, 575.5, 575.7, 575.8
See application file for complete search history.

(56) References Cited

U.S. PATENT DOCUMENTS

| 8,432,293 B2 | 4/2013 | Symons |
| 8,537,907 B2 | 9/2013 | Sung |

(Continued)

FOREIGN PATENT DOCUMENTS

EP      2 608 577 A1      6/2013

OTHER PUBLICATIONS

ECMA International, Near Field Communication Interface and Protocol (NFCIP-1), Standard ECMA-340, $2^{nd}$ Edition, Dec. 2004, 60 Pagess.

(Continued)

*Primary Examiner* — April G Gonzales
(74) *Attorney, Agent, or Firm* — Myers Bigel & Sibley, P.A.

(57) ABSTRACT

An apparatus includes an NFC circuit and an electrically conductive layer. The NFC circuit includes an antenna configured to inductively couple to signals emitted by another NFC circuit, a charging circuit configured to output power provided by the inductive coupling through the antenna to the signals emitted by the other NFC circuit, and a transceiver circuit configured to be powered by the charging circuit to transmit data for receipt by the other NFC circuit. The electrically conductive layer is removable from being on the NFC circuit, and while the electrically conductive layer is on the NFC circuit the transceiver circuit is prevented from transmitting. The electrically conductive layer can include a removable conductive sticker that electrically connects to one or more locations on the antenna, to a ground plane of the NFC circuit, and/or to another circuit node of the NFC circuit to prevent the transceiver circuit from transmitting.

21 Claims, 9 Drawing Sheets

(56) References Cited

U.S. PATENT DOCUMENTS

| | | | |
|---|---|---|---|
| 2008/0291852 A1* | 11/2008 | Abel | H04L 5/16 370/296 |
| 2008/0303632 A1* | 12/2008 | Hammad | G06F 1/1616 340/10.1 |
| 2009/0011706 A1 | 1/2009 | Wilson et al. | |
| 2010/0007467 A1 | 1/2010 | Breitfuss et al. | |
| 2010/0068996 A1 | 3/2010 | Haartsen | |
| 2011/0287714 A1 | 11/2011 | Wilson et al. | |
| 2012/0044059 A1 | 2/2012 | Saros et al. | |
| 2012/0137310 A1 | 5/2012 | Teruyama | |
| 2012/0149301 A1 | 6/2012 | Wiley | |
| 2012/0311723 A1 | 12/2012 | Britt, Jr. et al. | |
| 2012/0315845 A1* | 12/2012 | Buczek | H04M 1/7253 455/41.1 |
| 2013/0072114 A1* | 3/2013 | Abhyanker | H04B 5/0037 455/41.1 |
| 2013/0084800 A1 | 4/2013 | Troberg | |
| 2013/0124186 A1 | 5/2013 | Donabedian et al. | |
| 2013/0223631 A1 | 8/2013 | Greuet et al. | |
| 2013/0225077 A1* | 8/2013 | Schultz | H02J 7/025 455/41.1 |
| 2013/0333055 A1 | 12/2013 | Pallakoff et al. | |
| 2013/0344805 A1 | 12/2013 | Lefley | |
| 2014/0120905 A1 | 5/2014 | Kim | |
| 2014/0156791 A1 | 6/2014 | Sant et al. | |
| 2014/0273830 A1 | 9/2014 | Wong et al. | |
| 2015/0024683 A1 | 1/2015 | Hussain | |
| 2015/0026296 A1 | 1/2015 | Halpern | |
| 2015/0244421 A1 | 8/2015 | Nambord et al. | |
| 2015/0288421 A1 | 10/2015 | Nambord et al. | |
| 2015/0303994 A1 | 10/2015 | Dhayni | |
| 2015/0372721 A1 | 12/2015 | Bard | |

OTHER PUBLICATIONS

ECMA International, Near Field Communication Interface and Protocol (NFCIP-1), Standard ECMA-340, 3$^{rd}$ Edition, Jun. 2013, 52 Pages.

International Search Report and Written Opinion Corresponding to International Application No. PCT/JP2014/004900; Date of Mailing: Jan. 23, 2015; 14 pages.

International Search Report and Written Opinion Corresponding to International Application No. PCT/JP2014/004899; Date of Mailing: Jan. 23, 2015; 11 Pages.

International Search Report and Written Opinion Corresponding to International Application No. PCT/JP2014/004901; Date of Mailing: Jan. 28, 2015; 12 Pages.

NFC Forum, NFC Digital Protocol Technical Specification NFC Forum, Nov. 17, 2010; 194 Pages, Retrieved from the internet at URL http://cwi.unik.no/images/NFC_forum_digital_protocol.pdf.

* cited by examiner

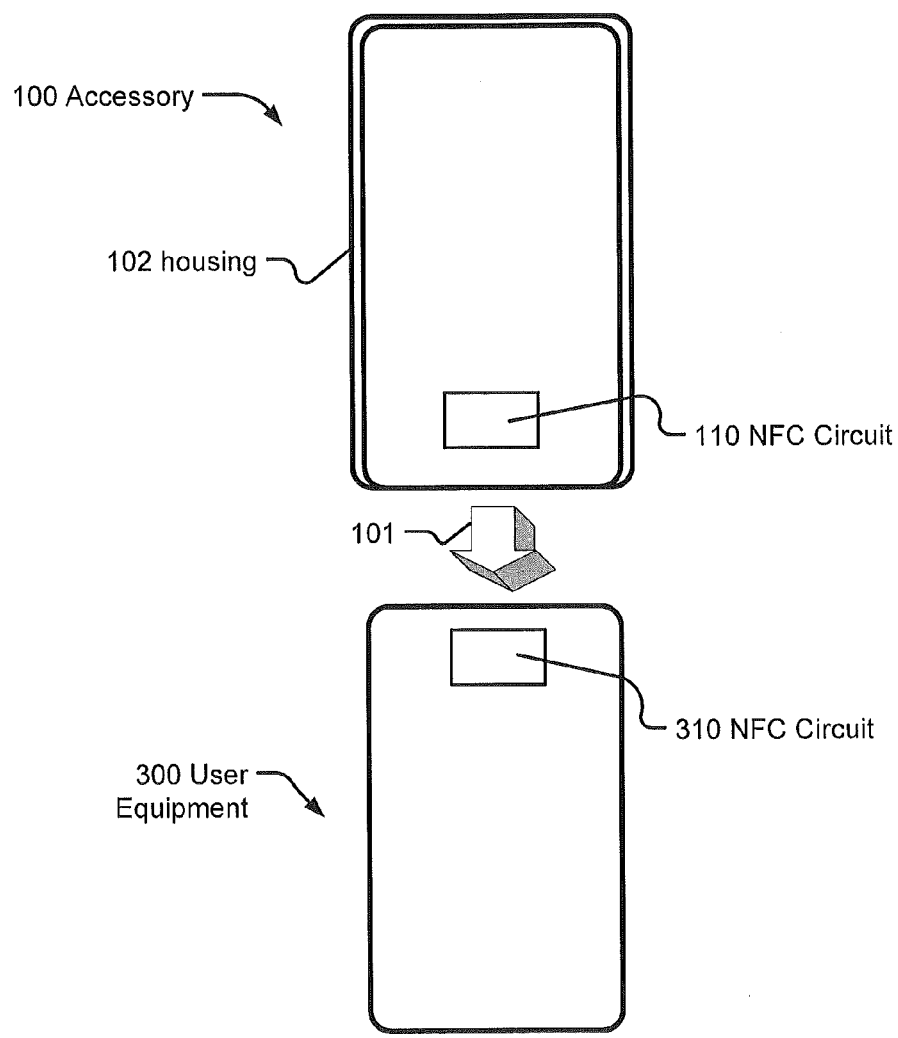
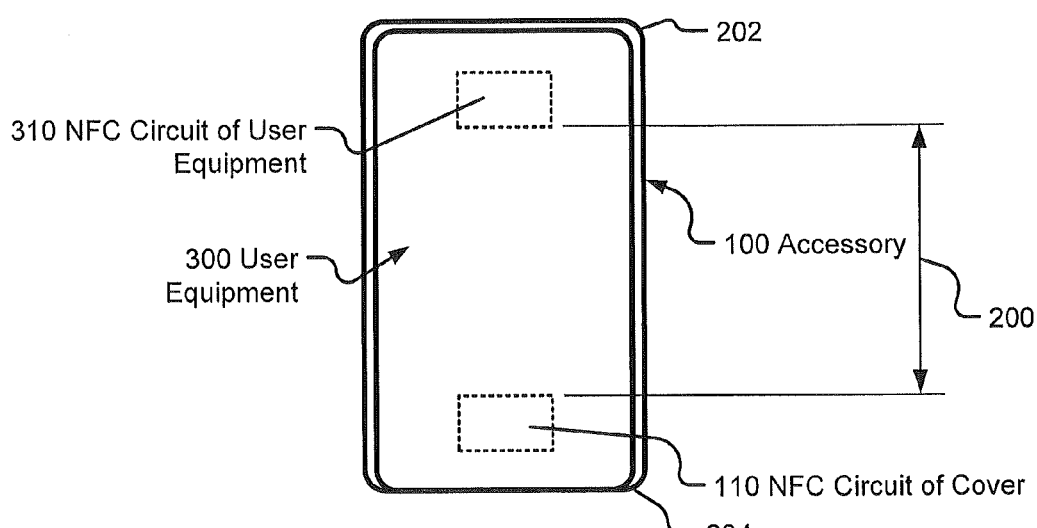

REMOVABLE CONDUCTIVE LAYER THAT SHIELDS AND/OR SHORTS NODES OF AN NFC CIRCUIT TO CONTROL TRANSMISSIONS THEREFROM

CROSS REFERENCE TO RELATED APPLICATION

This application claims priority to U.S. provisional Patent Application No. 61/942,716, filed 21 Feb. 2014, the disclosure and content of which is incorporated by reference herein in its entirety.

TECHNICAL FIELD

The present invention relates to wireless communication user equipment and, more particularly, to mobile phones and related accessories such as covers that are attachable to mobile phones.

BACKGROUND

Cell phones and other user equipment are increasingly including near field communication (NFC) circuits that can be used to communicate with external NFC circuits. Users can now operate user equipment to provide credit/debit account information to retail point-of-sale terminals, read data from NFC tags on items, determine the presence and absence of NFC tagged items, and perform other desirable operations. Unfortunately, with the tremendous proliferation of NFC circuits there are also increasing opportunities for time overlapping collisions to occur between the transmissions of nearby NFC circuits that can interfere with or prevent a user equipment from carrying out communications with a targeted NFC circuit.

SUMMARY

One embodiment of the present disclosure is directed to an apparatus that includes a near field communication (NFC) circuit and an electrically conductive layer. The NFC circuit includes an antenna configured to inductively couple to signals emitted by another NFC circuit, a charging circuit configured to output power provided by the inductive coupling through the antenna to the signals emitted by the other NFC circuit, and a transceiver circuit configured to be powered by the charging circuit to transmit data for receipt by the other NFC circuit. The electrically conductive layer is removable from the NFC circuit. While the electrically conductive layer is on the NFC circuit the electrically conductive layer prevents the transceiver circuit from transmitting.

In some further related embodiments, the electrically conductive layer may include a removable conductive sticker that electrically connects to one or more locations on the antenna, to a ground plane of the NFC circuit, and/or to another circuit node of the NFC circuit to prevent the transceiver circuit from transmitting.

The removable conductive sticker may electrically connect to two spaced apart locations on the antenna to short-circuit the antenna between the two spaced apart locations and render the antenna inoperable for receiving sufficient power from the signals emitted by the other NFC circuit to prevent operational powering of the transceiver circuit.

The antenna may be covered by a protective layer that is electrically non-conductive and has at least one via hole that exposes at least one contact at one or more locations on the antenna, a ground plane of the NFC circuit, and/or another circuit node of the NFC circuit. The removable conductive sticker may electrically connect through the at least one via hole to the exposed at least one contact. The protective layer may have a pair of spaced apart via holes that expose a pair of contacts at spaced apart locations on the antenna. The removable conductive sticker may electrically connect through the pair of spaced apart via holes to the pair of contacts to short-circuit the antenna extending between the pair of contacts and render the antenna inoperable for receiving sufficient power from the signals emitted by the other NFC circuit to prevent operational powering of the transceiver circuit.

The removable conductive sticker may electrically short an output of the charging circuit to ground to prevent power from the inductive coupling through the antenna to the signals emitted by the other NFC circuit from operationally powering the transceiver circuit.

The removable conductive sticker may include metal mesh wiring, a metal layer, or a metal line.

The electrically conductive layer may include a removable conductive sticker having metal mesh wiring or a metal layer. The electrically conductive layer may be removably attachable to cover at least the antenna of the NFC circuit to shield the antenna from signals emitted by another NFC circuit.

The NFC circuit may include a protective layer that is electrically non-conductive has a via hole that exposes contact on a ground plane of the NFC circuit. The metal mesh wiring or the metal layer of the removable conductive sticker may electrically connect through the via hole to the exposed contact on the ground plane.

The electrically conductive layer may include a portion of a switch that is actuated by a user to selectively electrically interconnect two or more nodes in the antenna, a ground plane of the NFC circuit, a charging circuit, and/or a transceiver circuit of the NFC circuit.

The electrically conductive layer may include a conductive bag in which the NFC circuit can be removably placed. The conductive bag may include metal mesh wiring and/or a metal layer that shields the antenna from signals emitted by another NFC circuit to prevent operational powering of the transceiver circuit.

Another embodiment of the present disclosure is directed to an accessory for a user equipment. The accessory includes a housing that is connectable to the user equipment, a NFC circuit attached to the housing, and an electrically conductive layer that is removable from being on the NFC circuit. The NFC circuit includes an antenna configured to inductively couple to signals emitted by another NFC circuit, a charging circuit configured to output power provided by the inductive coupling through the antenna to the signals emitted by the other NFC circuit, and a transceiver circuit configured to be powered by the charging circuit to transmit data for receipt by the other NFC circuit. While the electrically conductive layer is on the NFC circuit the electrically conductive layer prevents the transceiver circuit from transmitting.

In some further related embodiments, the housing may include a cover configured to protect a surface of the user equipment and/or a stand that supports and holds the user equipment in a defined orientation.

The electrically conductive layer may include a removable conductive sticker that electrically connects to one or more locations on the antenna, to a ground plane of the NFC circuit, and/or to another circuit node of the NFC circuit to prevent the transceiver circuit from transmitting.

The removable conductive sticker may electrically connect to two spaced apart locations on the antenna to short-circuit the antenna between the two spaced apart locations and render the antenna inoperable for receiving sufficient power from the signals emitted by the other NFC circuit to prevent operational powering of the transceiver circuit.

The antenna may be covered by a protective layer that is electrically non-conductive and has at least one via hole that exposes at least one contact at one or more locations on the antenna, a ground plane of the NFC circuit, and/or another circuit node of the NFC circuit. The removable conductive sticker may electrically connect through the at least one via hole to the exposed at least one contact.

The protective layer may have a pair of spaced apart via holes that expose a pair of contacts at spaced apart locations on the antenna. The removable conductive sticker electrically may connect through the pair of spaced apart via holes to the pair of contacts to short-circuit the antenna extending between the pair of contacts and render the antenna inoperable for receiving sufficient power from the signals emitted by the other NFC circuit to prevent operational powering of the transceiver circuit.

The removable conductive sticker may electrically short an output of the charging circuit to ground to prevent power from the inductive coupling through the antenna to the signals emitted by the other NFC circuit from operationally powering the transceiver circuit.

The electrically conductive layer may include a removable conductive sticker having metal mesh wiring or a metal layer, the electrically conductive layer is removably attachable to cover at least the antenna of the NFC circuit to shield the antenna from signals emitted by another NFC circuit.

The NFC circuit may include a protective layer that is electrically non-conductive has a via hole that exposes contact on a ground plane of the NFC circuit. The metal mesh wiring or the metal layer of the removable conductive sticker electrically connects through the via hole to the exposed contact on the ground plane.

The electrically conductive layer may include a portion of a switch that is actuated by a user to selectively electrically interconnect two or more nodes in the antenna, a ground plane of the NFC circuit, a charging circuit, and/or a transceiver circuit of the NFC circuit.

The electrically conductive layer may include a conductive bag in which the NFC circuit can be removably placed. The conductive bag includes metal mesh wiring and/or a metal layer that shields the antenna from signals emitted by another NFC circuit to prevent operational powering of the transceiver circuit.

Other NFC circuits, accessories for user equipment, and methods according to other embodiments will be or become apparent to one with skill in the art upon review of the following drawings and detailed description. It is intended that all such additional NFC circuits, accessories for user equipment, and methods be included within this description, be within the scope of the present invention, and be protected by the accompanying claims.

BRIEF DESCRIPTION OF THE DRAWINGS

Aspects of the present disclosure are illustrated by way of example and are not limited by the accompanying drawings. In the drawings:

FIG. 1 illustrates an accessory, such as a cover or stand, that is attachable to a user equipment, where each has a NFC circuit according to some embodiments;

FIG. 2 illustrates the accessory attached in a stored position relative to the user equipment of FIG. 1 according to some embodiments;

DETAILED DESCRIPTION

Figure 3:
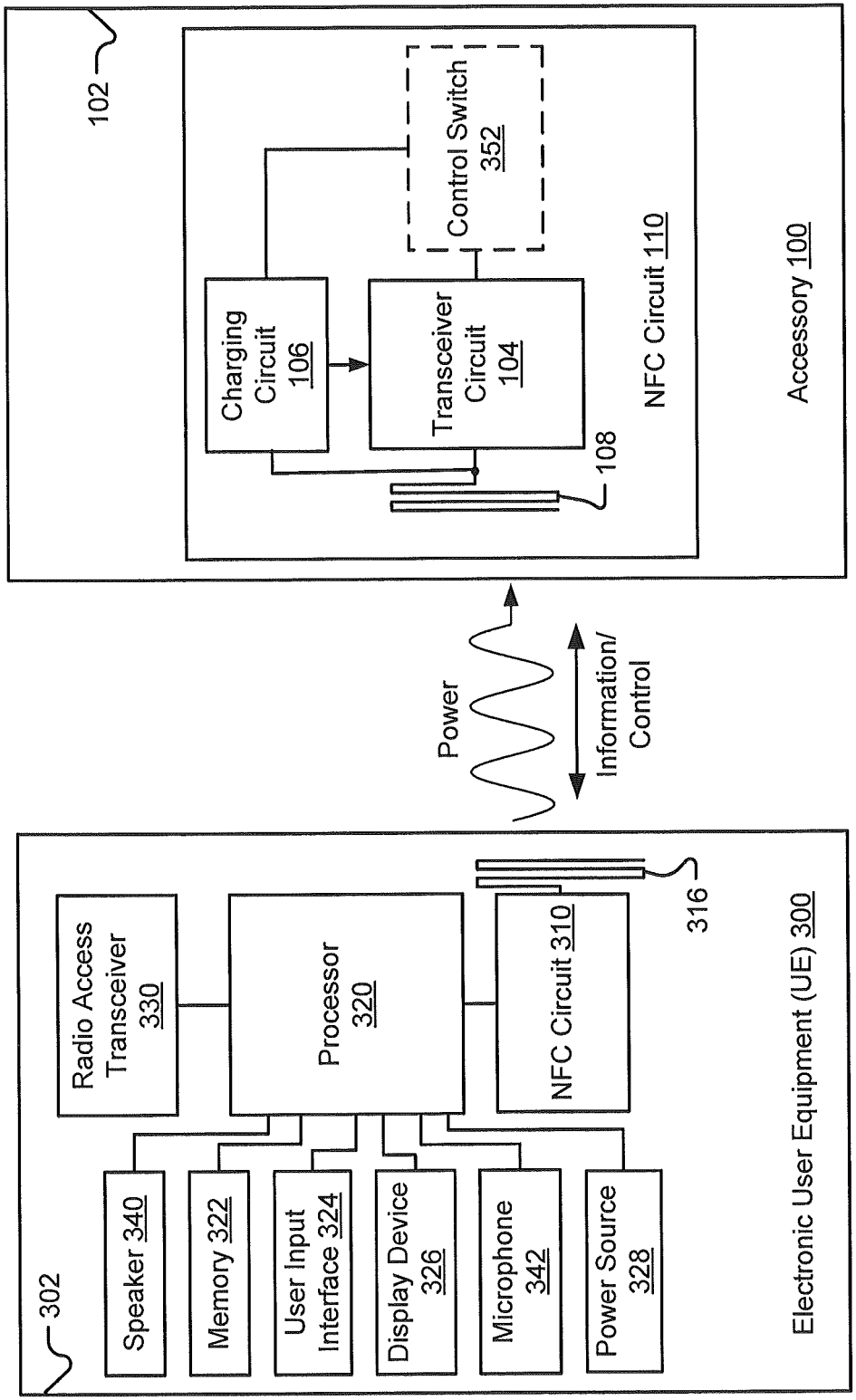
FIG. 3 is a block diagram of components of an accessory and a user equipment which both have NFC circuits configured according to some embodiments.

In the following detailed description, numerous specific details are set forth in order to provide a thorough understanding of embodiments of the invention. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to an accessory for a user equipment ("UE"). FIG. 1 illustrates an accessory 100 that is configured according to some embodiments for use with a UE 300. The accessory 100 includes a housing 102 that slides (e.g., along direction 101) on the UE 300 to become attached in a stored position relative to the UE 300. FIG. 2 illustrates the accessory 100 attached in a stored position relative to the UE 300 of FIG. 1 according to some embodiments. Although some embodiments of the accessory 100 are described as being configured to slide-on the UE 300, other embodiments may snap on, adhesively connect to, or otherwise maintain contact with or NFC communication range with the UE 300.

In one embodiment, the housing 102 has raised edge surfaces along at least two sides that form a central recessed surface area that extends to a recessed end of the housing to receive the UE 300 slid through the recessed end of the housing toward the stored position where the raised edge surfaces engage and retain the UE 300 in the stored position.

The accessory 100 may be a cover that, for example, protects a back surface of the UE 300, or a stand, such as a handsfree phone accessory, that supports and holds the UE 300 in a defined orientation. The UE 300 may be a cellular phone, a tablet computer, a palmtop computer, a mobile music/video player, or any other electronic device.

The accessory 100 has a NFC circuit 110, which is referred to as the "accessory NFC circuit 110", that is located on the housing 102, and may be at least partially disposed within the housing 102 or reside entirely within the housing 102. The UE 300 has another NFC circuit 310, which is referred to as the "UE NFC circuit 310". Thus, depending upon the proximity and configuration of the NFC circuits 110 and 310 while the accessory 100 is attached in the stored position relative to the UE 300, the accessory NFC circuit 110 may interfere with the ability of the UE NFC circuit 310 to communicate with a NFC circuit of a targeted device, such as a point of sale credit card processing terminal, a NFC tag on a product, which a user is attempting to communicate with through the UE 300.

For example, absent use of various embodiments disclosed herein, the accessory NFC circuit 110 could be positioned between the UE NFC circuit 310 and the NFC circuit of the targeted device, and located much closer to the UE NFC circuit 310 than the NFC circuit of the targeted device. Transmissions from the accessory NFC circuit 110 may thereby undesirably interfere (collide) with transmissions from the targeted device, and prevent reliable receipt by the UE 300 of data from the NFC circuit of the targeted device.

However, in accordance with some embodiments disclosed herein, the accessory NFC circuit 110 is attached at a location on the housing 102 and configured to be powered by inductive coupling to signals emitted by the other NFC circuit 310 within the UE 300 to temporarily operate to transmit data to the UE NFC circuit 310 as the accessory NFC circuit 110 passes over the UE NFC circuit 310 while the housing 102 is being slid on the UE 300 before reaching the stored position relative to the UE 300.

In some further embodiments, the accessory NFC circuit 110 becomes powered by inductive coupling to signals emitted by the UE NFC circuit 310 to temporarily operate to transmit data to the UE NFC circuit 310 as the accessory NFC circuit 110 passes over the UE NFC circuit 310 while the housing 102 is being slid off the UE 300. Furthermore, while the housing 102 is in the stored position relative to the UE 300, the accessory NFC circuit 110 is inhibited or prevented from transmitting data to the UE NFC circuit 310 irrespective of whether the UE NFC circuit 310 is emitting signals to attempt to provide inductive coupling to the accessory NFC circuit 110.

While the housing 102 is in the stored position relative to the UE 300, the accessory NFC circuit 110 is too remotely located from the UE NFC circuit 310 to be sufficiently powered by any inductive coupling to signals emitted by the UE NFC circuit 310 to operate the transmit data, according to one embodiment. For example, as shown in the embodiment of FIG. 2, the housing 102 has a top 202 that is adjacent an ear speaker 340 (FIG. 3) of the UE 300 and a bottom 204 that is adjacent a microphone 342 (FIG. 3) of the UE 300 while the housing 102 is in the stored position relative to the UE 300. The accessory NFC circuit 110 is located adjacent the bottom of the housing 102 and spaced apart by distance 200 to be remote from the UE NFC circuit 310 located adjacent the ear speaker of the UE 300. A location where the accessory NFC circuit 110 is fixed to the accessory 100 can be selected to provide sufficient communication isolation between the NFC circuits 110 and 310 to inhibit or prevent data transmission by the accessory NFC circuit 110 while the housing 102 is in the stored position relative to the UE 300.

FIG. 3 is a block diagram of components of the accessory 100 and the UE 300 that are connectable and configured to operate according to some embodiments. The UE 300 can include a housing 302, a processor circuit 320, a radio access transceiver 330, a NFC circuit 310, a memory device(s) 322, a display device 326, a user input interface 324 (e.g., touch sensitive interface for the display device 326, keypad/keyboard, button(s)/switch(es), etc.), a power source 328 (e.g., rechargeable battery) that supplies power to these and other components, a speaker 340, and a microphone 342. The radio access transceiver 330 may include, but is not limited to, a LTE or other cellular transceiver, Bluetooth transceiver, WiFi transceiver, WiMax transceiver, or other communication transceiver is configured to communicate with a network node of a telecommunications system. The processor 320 may include one or more data processing circuits, such as a general purpose and/or special purpose processor, such as a microprocessor and/or digital signal processor. The processor 320 is configured to execute computer program instructions from functional modules in the memory 322, described below as a computer readable medium, to perform at least some of the operations and methods described herein as being performed by a user equipment.

The accessory 100 includes a NFC circuit 110 (e.g., accessory NFC circuit) that can be powered by and communicate with the UE NFC circuit 310 using short-range high frequency wireless communication technology which enables the exchange of data between devices over about a 10 cm distance, although the NFC circuits 110 and 310 are not limited to operating in any defined range. The communication protocol and operation can be an extension of the ISO 14443 proximity-card standard (e.g., contactless card, RFID) and can be specified in the ECMA-340 and ISO/IEC 18092 technology standards. Some embodiments of the NFC circuits 110 and 310 may communicate using existing ISO 14443 smartcards and readers and can thereby be compatible with existing contactless communication infrastructure.

The NFC circuits 110 and 310 may communicate via magnetic field induction. A loop antenna 316 connected to the NFC circuit 310 and a loop antenna 108 of the accessory NFC circuit 110 are placed in close proximity to each other within the other's antenna near field, thereby effectively forming an air-core transformer. Some embodiments of the NFC circuits 110 and 310 can transmit within the globally available and unlicensed radio frequency ISM band of 13.56 MHz, with a bandwidth of almost 2 MHz. Some embodiments of the NFC circuits 110 and 310 can support data rates of 106, 212, or 424 kbit/s using a modified Miller coding or Manchester coding to encode and decode communicated data.

The accessory NFC circuit 110 can be configured to operate in a passive communication mode, because the accessory 100 does not have its own power source. In contrast, the UE NFC circuit 310 can be configured to operate in an active communication mode because of the power source 322 (FIG. 3), e.g., rechargeable battery, of the UE 300. When operating in the passive communication mode, the UE NFC circuit 310 provides a carrier field and the accessory NFC circuit 110 answers by modulating the carrier field. In this mode, the accessory NFC circuit 110 generates its operating power from the NFC circuit 310 provided electromagnetic field, thus making the accessory NFC circuit 110 a transponder. In some other embodiments the accessory NFC circuit 110 contains a power supply and is configured to operate in an active communication mode.

The NFC circuit 110 includes a charging circuit 106 that can become inductively coupled to the UE NFC circuit 310 through the antenna 108 to generate power therefrom, and which it provides to a transceiver circuit 104. The transceiver circuit 104 transmits data through the antenna 108 to the UE NFC circuit 310 using the power from the charging circuit 106. The transceiver circuit 104 may optionally be configured to receive data through the antenna 108 from the UE NFC circuit 310.

After an initial receipt and use of information from the accessory NFC circuit 110, the UE 300 may be configured to subsequently ignore information from the accessory NFC circuit 110 to avoid interference with communications between the NFC circuit 310 of the UE 300 and other NFC devices.

Using NFC Enabled Accessories to Provide Movies, Music, Games, Books, Promotional Information, Coupons, and Other Content NFC enabled accessories for UEs can be sold or otherwise provided to consumers to provide applications that are executable by the UEs, activate operational features of the UEs, and/or to provide other content to the UE. The content may include, for example, movies, music (e.g., songs, ring tones, etc.), electronic books, television programs, games, discount coupons, promotional information, etc.

A movie studio may sell or otherwise provide movie themed covers or other accessories for UEs. The accessories can include a NFC circuit which transmits information that is used by the UE to obtain content from a content server and/or to unlock/activate content that may already reside on the UE that relates to the movie. For example, a NFC circuit may transmit information that contains a universal resource locator (URL) address to particular content stored on a content server, which is accessible through a data network, that can be retrieved by downloading/streaming the movie, music relating to the movie, background display image(s) relating to the movie, promotional information relating to the movie, discount that can be redeemed to purchase or temporarily view the movie, etc. A business may therefore work with a content provider to make content available through a network content server (e.g., a cloud service server), and can configure an accessory NFC circuit to transmit a URL to the location of the content stored on the server. The accessory NFC circuit may further transmit authorization information that can be used by the server to confirm that a UE requesting access to the content is indeed authorized to obtain such access through use of the accessory NFC circuit.

Other covers/accessories can be provided by music promoters, game developers, sports teams, and/or retail businesses that include a NFC circuit 110 which transmits information that is used by the UE to obtain content from a content server and/or to unlock/activate content that may already reside on the UE relating. For example, the NFC circuit 110 may transmit information that contains a URL to particular content stored on a content server, which is accessible through a data network, that can be retrieved by downloading/streaming the music or game, photographic image(s) relating to the music/game/business, promotional information relating to the music/game/business, discount that can be redeemed to purchase or temporarily access the music/game, and/or that can be used when purchasing through the business.

The information may contain a URL that points to server location that can provide a plurality of content themes that can be provided to the UE, contain a theme ID that specifies a particular content theme that can be provided to the UE, and/or contain a unique ID, such as an ID that is unique from other accessory NFC circuits, that is used to obtain a user/UE specific license to content.

For example, an online retailer may sell or otherwise provide phone covers having visible, e.g., printed, branding relating to the online retailer or partner thereof and including a NFC circuit which transmits information that can be used by the UE to download a retail application from a content server, and which may further provide a discount coupon that be used when purchasing through the online retailer. By way of another example, a restaurant may sell or otherwise provide phone covers having visible branding relating to the restaurant and/or a business partner, e.g., a movie studio, music artist, sports team, etc. being promoted by the restaurant, and which provides a URL to a location on a content server having promotional information relating to the restaurant and/or the business partner. Other business models that may beneficially use NFC enabled accessories to provide content to users can include sponsorship businesses, charitable businesses, telecommunication provider businesses, movie studios/distributors, music studios/distributors, and retailers. The NFC enabled accessories can encourage and facilitate collaborative business relationships between accessory manufacturers, UE manufacturers, UE operators, and/or content providers to distribute content through UEs for use by targeted users.

Information received by a UE from the cover NFC circuit may provide a limited duration license, a limited number of use license, a partially paid-up subscription-based license, or a fully paid-up perpetual license for use of defined content on the UE. A content license may require continuing presence of the cover NFC circuit, such that removal of the cover from the UE automatically terminates the license and disables use of the content. The cover NFC circuit may thereby control licensing of content.

In the embodiment of FIG. 3, the UE 300 can communicate information through the radio access transceiver 330 to a content server to, for example, download an application program for execution by the processor 320 of the UE 300. The UE 300 may obtain from the content server text, graphics, photographic images (e.g., background display wallpaper, locked screen display wallpaper, etc.), an electronic book, movie, television program, and/or other content for display on the display device 326 of the UE 300, and/or music (e.g., song, ringtone, etc.) or other audio content to be played through the speaker 340 of the UE 300. In a further embodiment, the accessory NFC circuit 110 transmits a product code or other information to the UE NFC circuit 310 that activates functionality within the user equipment 300. The UE 300 may communicate through the radio access transceiver 330 to the content server to, for example, obtain an activation code for an application hosted by the UE 300.

Controlling Activation of Accessory NFC Circuit

As explained above, NFC enabled covers for UEs can be sold to consumers to provide applications that are executable by the UEs, activate operational features of the UEs, and/or to provide other content to the UE. Because activation of the accessory NFC circuit 110 causes transmission of information that can be used to obtain applications, movies, music, and other proprietary and valuable content, it can be important to control who obtains such information. For example, it is envisioned that NFC enabled accessories can be displayed within stores for sale or otherwise made publicly accessible. It can therefore be important to prevent unauthorized reading of information from the accessory NFC circuit 110 by a person who, for example, seeks to obtain access to the content without purchasing the accessory.

Some embodiments of the present disclosure are directed to controlling how the accessory NFC circuit 110 is initially or subsequently activated. One or more of these embodiments can be used to prevent a person from using a UE or other NFC reader device to activate an accessory NFC circuit 110 to read information until actions are taken to allow such activation of the NFC circuit 110.

Figure 4:
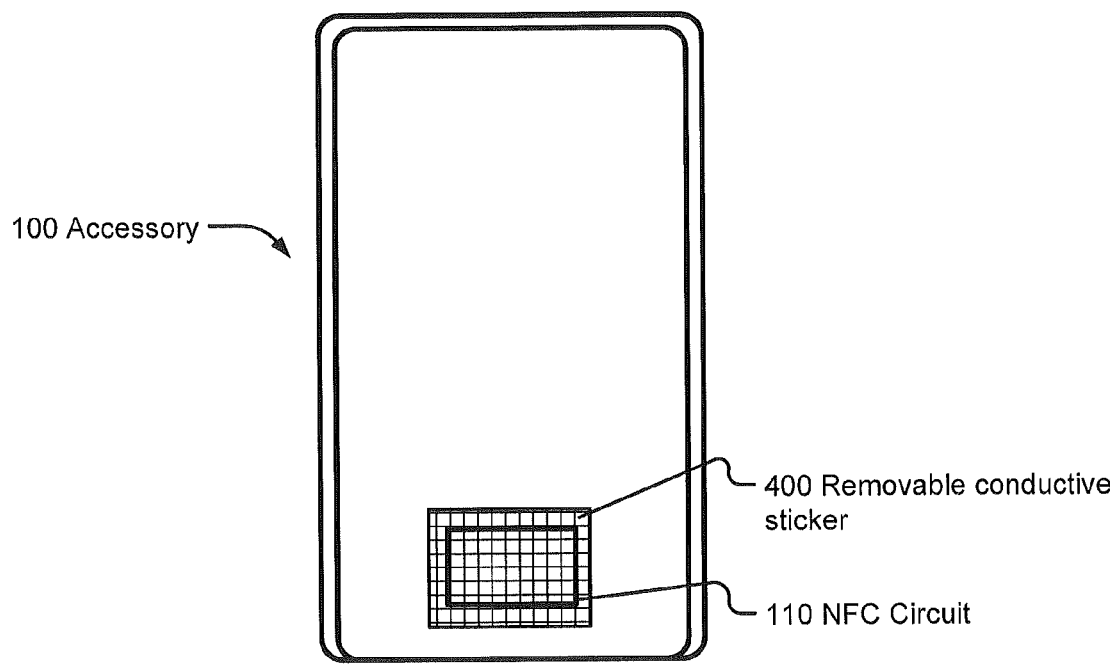
FIG. 4 illustrates a removable conductive sticker configured to shield the NFC circuit from other device NFC signals and prevent unauthorized activation of the NFC circuit, according to some embodiments.

Using a Removable Conductive Sticker to Control Transmissions from an NFC Circuit FIG. 4 illustrates an accessory 100 having a NFC circuit 110. The NFC circuit 110 is covered by a removable conductive sticker 400 that is configured according to one embodiment and positioned over the NFC circuit 110 to shield the NFC circuit 110 from NFC signals generated by an adjacent NFC reader device. The conductive sticker 400 may include conductive (e.g., metal) mesh wiring or a conductive (e.g., metal) layer that extends across at least a major portion of the antenna 108, extends across the entire antenna 108, or extends across the entire NFC circuit 110 to shield the antenna 108 from NFC signals that are generated by an adjacent NFC reader device. The conductive portion of the sticker 400 may be electrically connected to a ground plane of the NFC circuit 110 to raise a voltage of the ground plane responsive to shielded NFC signals and, thereby, nullify any inductive coupling of the NFC signals to the antenna 108. The NFC circuit 110 can be enabled for activation by removing (e.g, peeling-off) the conductive sticker 400.

Removing the conductive sticker 400 eliminates the shielding and enables the NFC circuit 110 to be inductively powered by NFC signals from a NFC reader device. A user may therefore be instructed to remove the conductive sticker 400 after purchasing or otherwise receiving the accessory 100 to enable initial activation of the accessory NFC circuit 110. The conductive sticker 400 may be reinstalled, e.g., reattached to its original position, after the user has operated the UE 300 to read information from the accessory NFC circuit 110. Reinstalling the conductive sticker 400 can prevent an unauthorized other NFC reader device from reading information from the accessory NFC circuit 110 and, thereby, prevent unauthorized access to the applications, operational features, and/or other content authorized to the user by possession of the accessory 100.

Figure 5:
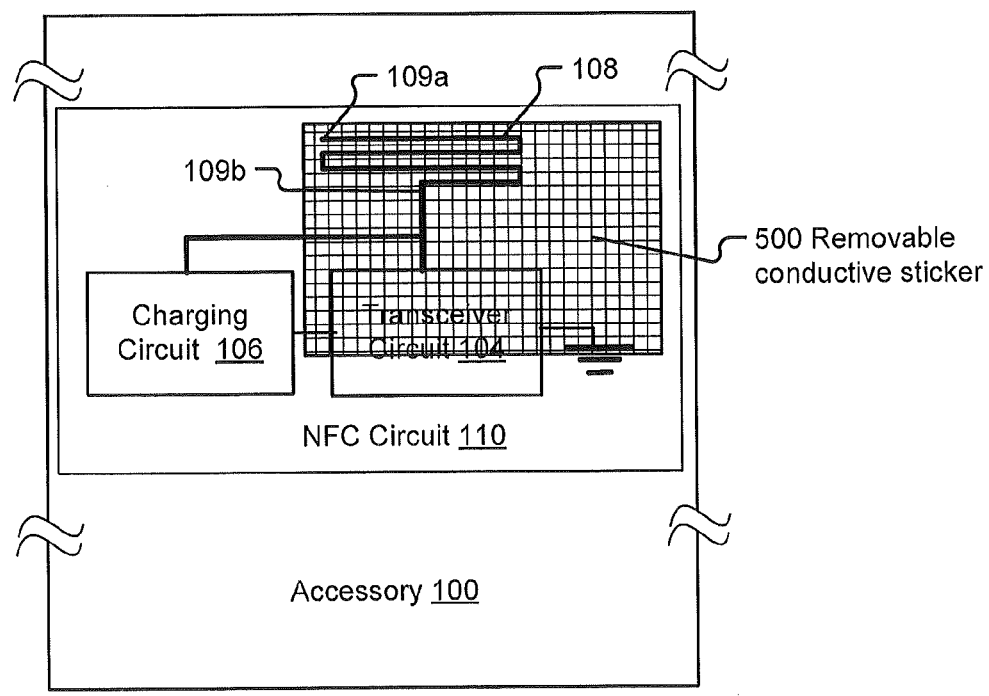
FIG. 5 illustrates another embodiment of a removable conductive sticker configured to short-circuit one or more components of the NFC circuit to prevent unauthorized activation of the NFC circuit, according to some embodiments.

FIG. 5 illustrates some other embodiments of a removable conductive sticker 500 that electrically connects to one or more locations on the antenna 108, a ground plane of the NFC circuit 100, and/or to another circuit node of the NFC circuit 100. The transceiver circuit 104 can be powered by a voltage differential between a circuit node at the output of the charging circuit 106 and a circuit node on the ground plane. The conductive sticker 500 may include metal mesh wiring, a metal layer, or a metal line. The conductive sticker 500 may electrically connect to and short-circuit two locations on the antenna 108 to render the antenna 108 inoperable for receiving sufficient power from NFC signals from a NFC reader device to prevent operational powering of the NFC circuit 110. In one embodiment, the conductive sticker 500 connects an end portion 109*a* of the antenna 108 that is remote from the transceiver circuit 110 and another portion 109*b* of the antenna 108 that is adjacent to the transceiver circuit 104, thereby providing a short-circuit across the antenna 108. The antenna 108 may be covered by a protective layer but have one or more openings, e.g. via holes, exposed through the protective layer that are configured to allow electrical connection between the exposed portion(s) of the antenna 108 and the conductive sticker 500.

In another embodiment, the conductive sticker 500 electrically connects the antenna 108 to a ground plane of the NFC circuit 110 to short-circuit the antenna 108. Accordingly, the ground plane may also be covered by a protective layer having openings that expose a portion of the ground plane for electrical connection to the conductive sticker 500.

In another embodiment, the conductive sticker 500 electrically connects the antenna 108 to a circuit node between the transceiver circuit 104 and the charging circuit 106 to render the charging circuit 106 incapable of generating sufficient power to operate the NFC circuit 110.

Removing the conductive sticker 500 eliminates the electrical connection therethrough and enables inductive powering of the NFC circuit 110 by NFC signals from a NFC reader device, such as the user equipment 300. A user may therefore be instructed to remove the conductive sticker 500 after purchasing or otherwise receiving the accessory 100 to enable initial activation of the NFC circuit 110 of the accessory 100. In this manner, an unauthorized person is prevented from reading information from the accessory NFC circuit 110 unauthorized NFC reader device before the accessory 100 is purchased, such as while the accessory resides on a store shelf within protective packaging which precludes removal of the conductive sticker 500. The conductive sticker 500 thereby operates to prevent unauthorized access to the applications, operational features, and/or other content enabled by reading of the information from the accessory NFC circuit 110 before purchase of the accessory 100.

The conductive sticker 500 may be reinstalled, e.g. reattached to its original position, after the user has operated the UE 300 to read information from the accessory NFC circuit 110. Reinstalling the conductive sticker 500 can prevent an unauthorized NFC reader device from reading information from the accessory NFC circuit 110 and, thereby, prevent unauthorized access to the applications, operational features, and/or other content authorized to the user by possession of the accessory 100.

Figure 6:
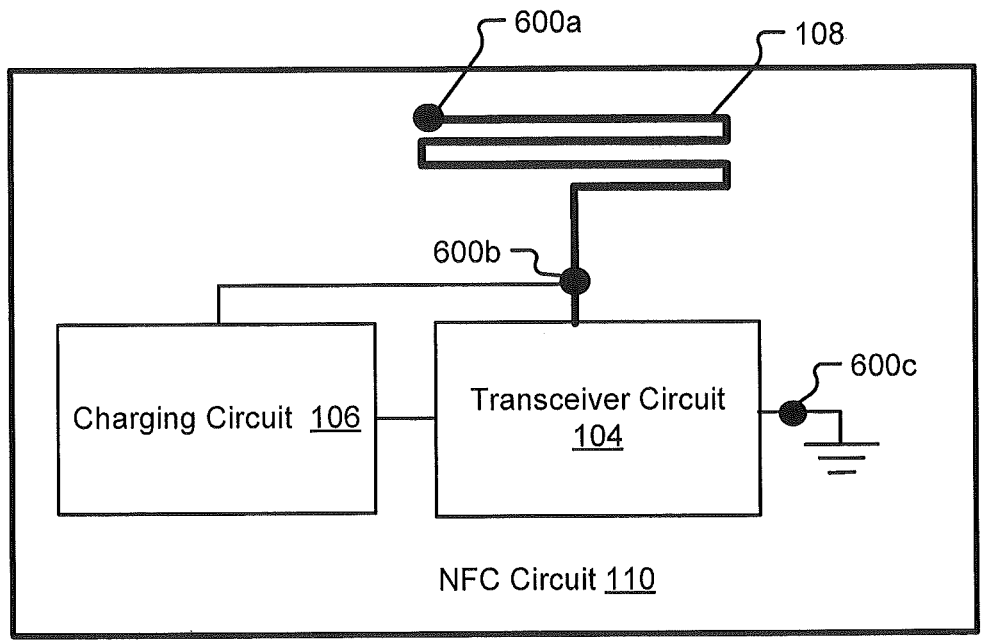
FIG. 6 illustrates further detail of two conductive contacts on the antenna of FIG. 5 that short-circuited through the removable conductive sticker to prevent transmission, according to some embodiments.
Figure 7:
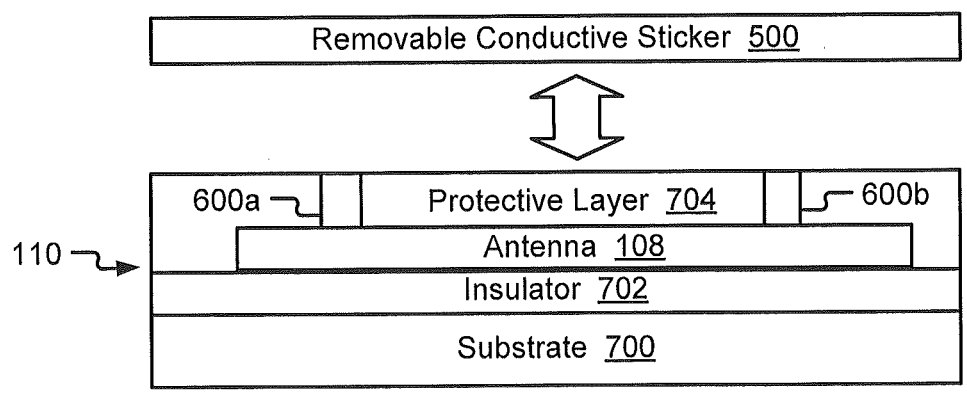
FIG. 7 illustrates a cross-sectional view of various layers of a portion of the NFC circuit of FIG. 6, and includes conductive contacts that are short-circuited through the removable conductive sticker to prevent transmission, according to some embodiments.

FIG. 6 illustrates further detail of two conductive contacts on the antenna 108 of FIG. 5 that are short-circuited through the removable conductive sticker 500 to prevent transmission, according to some embodiments. FIG. 7 illustrates a cross-sectional view of various layers of a portion of the NFC circuit 110 of FIG. 6, and includes conductive contacts 600*a* and 600*b* that are short-circuited through the removable conductive sticker 500 to prevent transmission, according to some embodiments.

The removable conductive sticker 500 electrically connects two spaced apart contracts 600*a* and 600*b* on the antenna 108 to short-circuit the antenna 108 between the two spaced apart contracts 600*a* and 600*b* and render the antenna 108 inoperable for receiving sufficient power from the signals emitted by the UE NFC circuit 310 to prevent operational powering of the transceiver circuit 104.

Referring to FIGS. 6 and 7, the NFC circuit 110 can include a substrate 700, which may be a portion of the housing 102 of the accessory 100, and can include an insulator 702 that is between and electrically isolates the antenna 108 and the substrate 700. The antenna 108 is covered by a protective layer 704 that is electrically non-conductive and has at least one via hole that exposes at least one contact 600*a* and/or 600*b* at one or more locations on the antenna 108, a ground plane 600*c* of the NFC circuit 110, and/or another circuit node (e.g., 800*a* and 800*b* of FIG. 8) of the NFC circuit 110.

In the embodiment of FIG. 7, the removable conductive sticker 500 electrically connects through the pair of via holes to the exposed spaced apart pair of contact 600a and 600b to short-circuit the antenna 108 extending between the contact 600a and 600b and render the antenna 108 inoperable for receiving sufficient power from the signals emitted by the UE NFC circuit 310 to prevent operational powering of the transceiver circuit 104.

Figure 8:
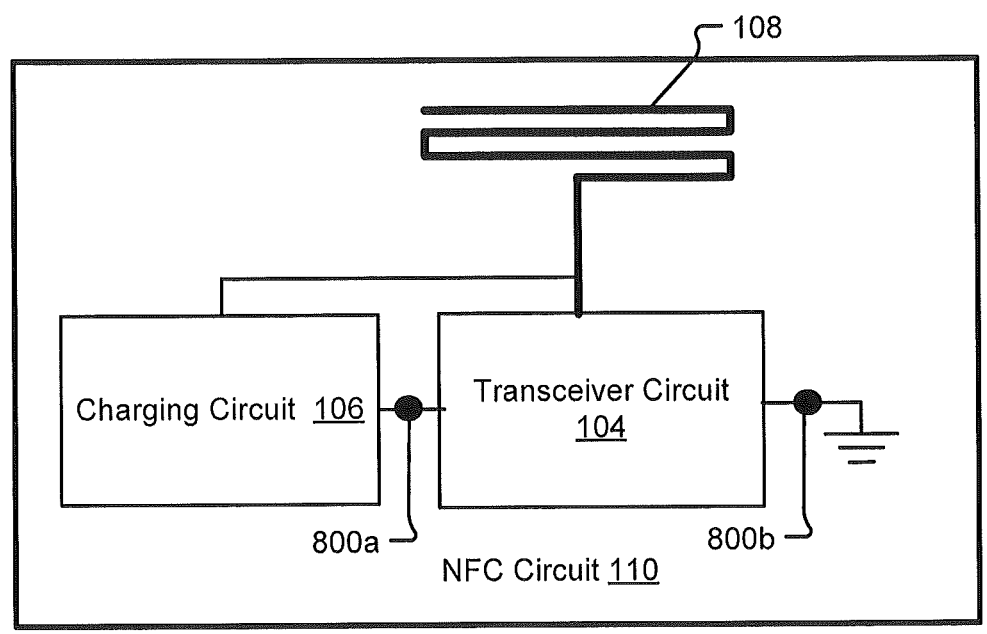
FIG. 8 illustrates further detail of two conductive contacts that are used to short-circuit the output of the charging circuit to the ground plane through the removable conductive sticker to prevent transmission, according to some embodiments.

FIG. 8 illustrates further detail of two conductive contacts 800a and 800b that are used to short-circuit the output of the charging circuit 106 to the ground plane through the removable conductive sticker 500 to prevent power from the inductive coupling through the antenna 108 to the signals emitted by the UE NFC circuit 310 from operationally powering the transceiver circuit 104, according to some embodiments. The removable conductive sticker 500 can include metal mesh wiring, a metal layer, or a metal line, as explained above.

Referring again to FIG. 3, the electrically conductive layer of the NFC circuit 110 can include a portion of a control switch 352 that is actuated by a user to selectively electrically interconnect two or more nodes in the antenna 108, a ground plane of the NFC circuit, the charging circuit 106, and/or the transceiver circuit 104. The control switch 352 may, for example selectively short-circuit a contact on the antenna 108 to the ground plane, selectively short-circuit two spaced apart contacts on the antenna 108, selectively short-circuit the output of the charging circuit 106 to the ground plane, and/or selectively short-circuit the output of the transceiver circuit 104 to the ground plane.

A user may therefore be instructed to actuate the control switch 352 to a first position that enables the NFC circuit 110 to become powered by the UE NFC circuit 310, and thereafter oppositely actuate the control switch 352 to a second position that disables the NFC circuit 110 from becoming powered by the UE NFC circuit 310. The control switch 352 may be a contact switch that is mechanically actuated (e.g., depressed) by the user sliding the accessory 100 (e.g., cover) on the UE 300 or otherwise connecting the accessory 100 (e.g., cover) to the UE 300. The control switch 352 may be a magnetic switch that is actuated by the user connecting the accessory 100 (e.g., cover) to the UE 300 to cause a magnet within the UE 300 to actuate a magnetic switch (e.g., reed switch) of the accessory NFC circuit 110 which electrically connects two nodes within the NFC circuit 110 that then enables transmission of the information and/or that electrically disconnects a short-circuit between two nodes within the NFC circuit 110 that by disconnection that then enables transmission of the information by the transceiver circuit 104.

Conductive Bag for Shielding Accessory NFC Circuit

Figure 9:
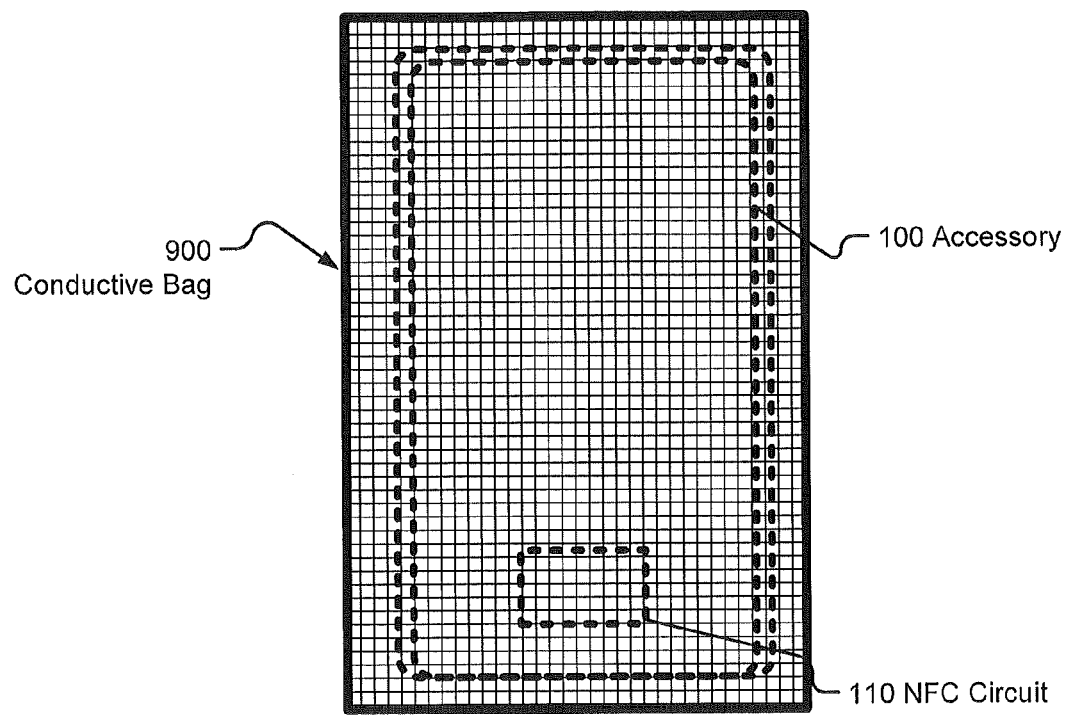
FIG. 9 illustrates a conductive bag configured according to some embodiments to shield an accessory NFC circuit from other device NFC signals while the accessory is contained in the conductive bag.
Figure 10:
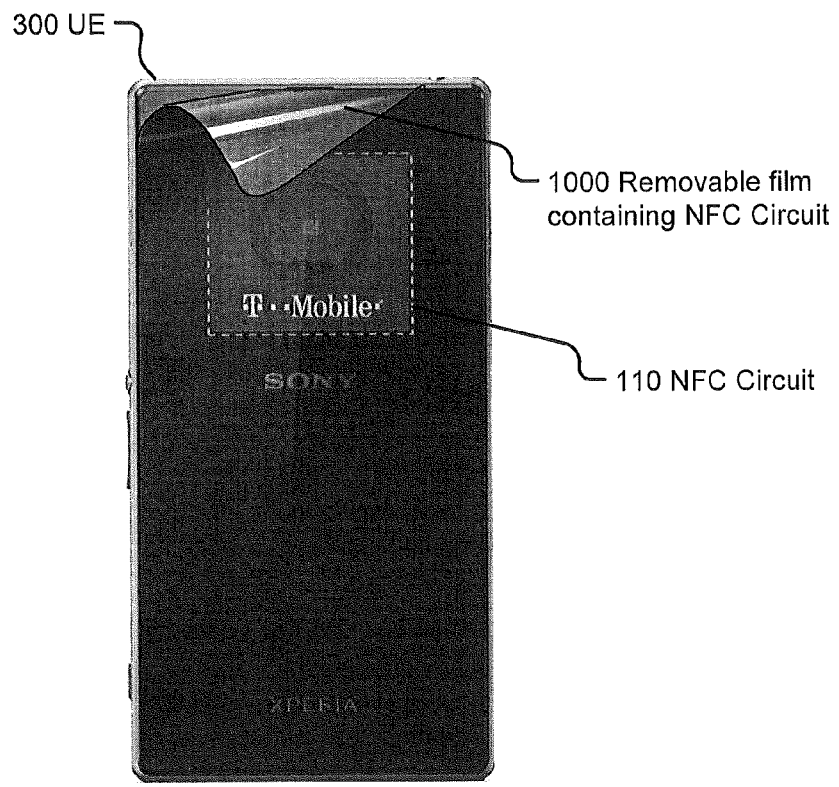
FIG. 10 illustrates a removable film that contains a NFC circuit and is attachable to a user equipment.
Figure 11:
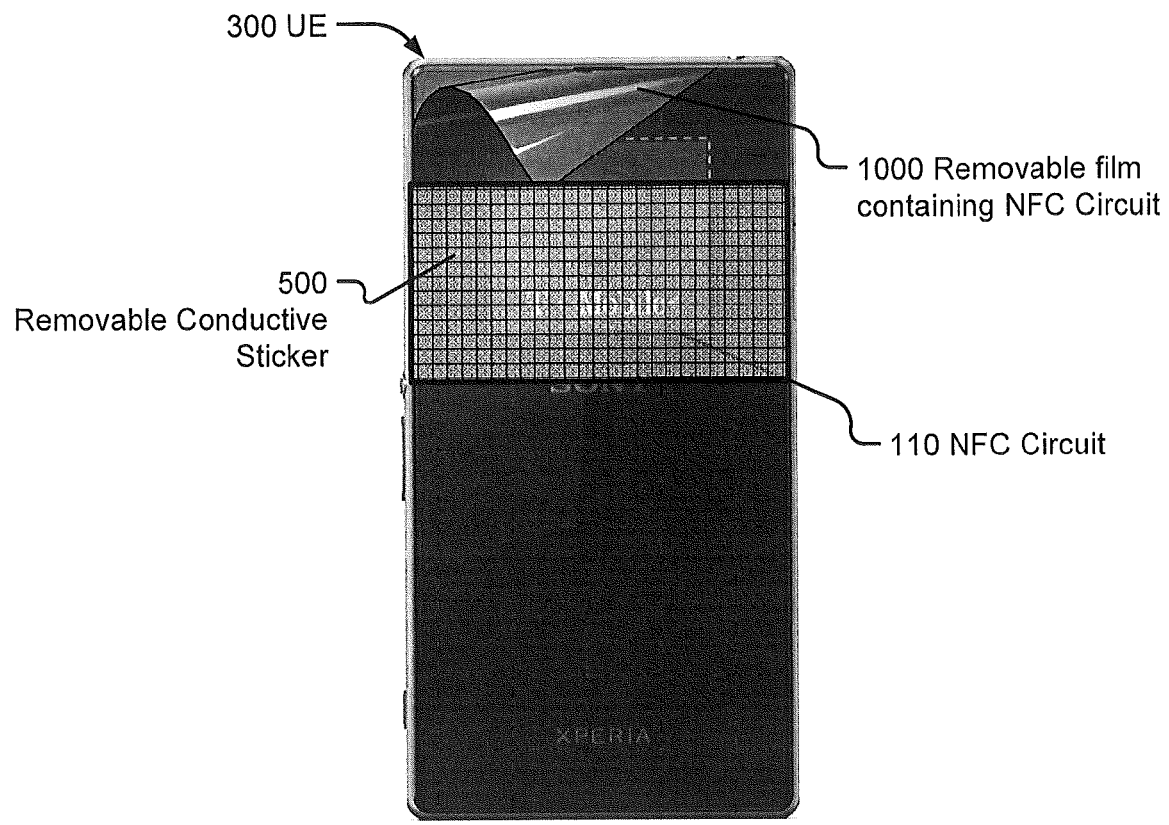
FIG. 11 illustrates a removable conductive sticker that is used to shield the NFC circuit of the film of FIG. 10 from other device NFC signals and prevent unauthorized activation of the NFC circuit, according to some embodiments.

FIG. 9 illustrates the accessory 100 that is within a conductive bag 900. The conductive bag 900 may include conductive, e.g., metal, mesh wiring or a conductive (e.g., metal) layer that extends entirely around the NFC circuit 110 and may extend entirely around the accessory 100 residing within the conductive bag 900. The conductive bag 900 shields the NFC circuit 110 therein from NFC signals generated by a NFC reader device and, thereby, prevents operational powering of the NFC circuit 110. While the accessory 100 is within the conductive bag 900, a user cannot energize the NFC circuit 110 to receive information therefrom. Thus, the conductive bag 900 can prevent unauthorized access to (e.g., theft of) information from the NFC circuit 110 before the accessory 110 is purchased or other provided to an authorized user.

A user may therefore be instructed to remove the accessory 100 from the conductive bag 900 before attempting to operate the UE 300 to read or otherwise activate the accessory NFC circuit 110.

Accessory Configured as a Removable Film

FIG. 7 illustrates a film 1000 that can be removably attached to a major surface of the UE 300. The film 1000 includes a NFC circuit 110. The NFC circuit 110 may be attached to the film 1000, e.g., adhesively connected thereto, or may be at least partially disposed or entire enclosed within a material of the film 1000.

In one embodiment, one surface of the film 1000 has an adhesive or sticky surface that can adhere to a back surface of the UE 300, such a back surface that is opposite to a front surface having a display or user interface. A user may thereby adhere the film 1000 to a surface of the UE 300 to enable the UE NFC circuit 310 to read information from the accessory NFC circuit 110.

The film NFC circuit 110 communicate information to the UE 300 is used to customize operation of the UE 300 and/or that is used by the UE 300 to obtain content from a content server through a communication network. For example, the film NFC circuit 110 may identify a set of parameters used by the UE 300 to customize operation for a geographic region of the world and/or to comply with telecommunication operator preferences. When the UE 300 is initially set up, it can read the parameters from the film NFC circuit 110 and control its initial setup responsive thereto. A user can be instructed to remove (e.g., peel off) the film 1000 after completion of the initial UE setup to avoid potential interference from the film NFC circuit 110 when the NFC circuit 310 of the UE 300 communicates with other NFC communication devices.

FIG. 8 illustrates the film 1000 applied to the UE 300 of FIG. 7. A conductive sticker 500 has been connected to the film to shield the accessory NFC circuit 110 from NFC signals from the UE 300 and/or from another NFC device. The conductive sticker 500 may be configured according to one or more of the embodiments of FIGS. 4 and 5.

The conductive sticker 500 may shield the NFC circuit 110 from NFC signals from a NFC reader device other than the 300 UE. For example, as shown in FIG. 8, the conductive sticker 500 may be on a side of the film 1000 that is opposite to a side of the film 1000 contacting the UE 300. The conductive sticker 500 can operate to shield the covered NFC circuit 110 from NFC signals from a NFC device which would need to penetrate through the conductive sticker 500 to energize the NFC circuit 110, while allowing the NFC circuit 110 to communicate with the NFC circuit 310 within the UE 300. Such operation may be advantageous to prevent/inhibit reading of information from the NFC circuit 110 by a device other than the UE 300.

The conductive sticker 500 may be configured to reduce the effective communication range of the NFC circuit 110 so as to reduce the ability of another NFC reader device to receive information from the NFC circuit 110 while the film 1000 is attached to the UE 300. The conductive sticker 500 may, for example, electrically connect to one or more locations on the antenna 108 to reduce the effective length of the antenna 108 and/or inductive coupling efficiency of the antenna 108. The antenna 108 may be covered by material of the film 1000, which material may be patterned to provide one or more openings exposing a location(s) on the antenna 108 that is electrically connectable to the conductive sticker 500. The one or more locations can be selected to enable the NFC circuit 310 of the UE 300 to communicate with the NFC circuit 110 of the film 1000, while effectively preventing another further spaced apart NFC reader device from communicating with the NFC circuit 110 (e.g., prevent a NFC reader device more remote than the UE 300 from being able to operationally power the NFC circuit 110 through inductive coupling and/or prevent the NFC reader device from receiving information transmitted by the NFC circuit 110).

Point-of-Sale Communication of Information from NFC Enabled Accessory

Figure 12:
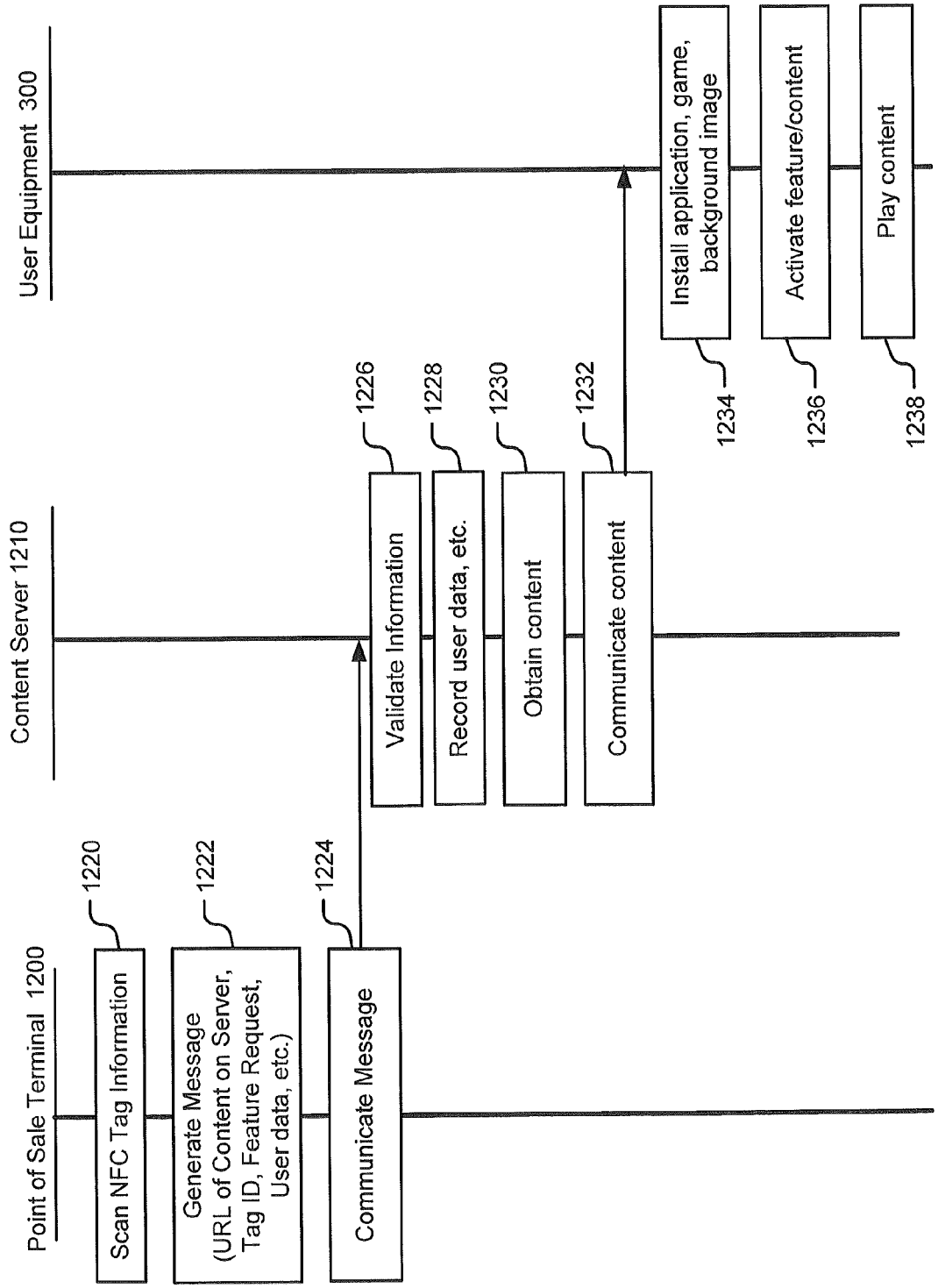
FIG. 12 illustrates a data flow diagram and flowchart of operations that can be performed by a point-of-sale terminal, a server, and a user equipment to obtain and use information from an accessory NFC circuit to provide an application, operational feature, and/or other content to the user equipment.

FIG. 12 illustrates a data flow diagram and flowchart of operations that can be performed by a point-of-sale terminal 1200, a content server 1210, and a UE 300 to obtain and use information from an accessory NFC circuit tag (NFC tag) to provide an application, operational feature, and/or content to the UE 300.

Referring to FIG. 12, the point-of-sale terminal 200, such as a retail sale checkout terminal, can be operated to scan (block 1220) the NFC tag to obtain information therefrom. The point-of-sale terminal 1200 generates (block 1222), based on the information from the NFC tag, a message that can contain a URL to a location of an application, operational feature, and/or other content that is stored on the content server 1210, a tag ID or unique identifier for the NFC tag, a request for a defined operational feature, user data that identifies contact information for the user and/or identifies the UE, such as a mobile terminal ID, network address, telephone number, etc. . . . The point-of-sale terminal 1200 communicates (block 1224) the message to the content server 1210.

The content server 1210 may validate (block 1226) information in the message to confirm that the UE 300 is authorized to receive content. If the information is not properly validated the operations can cease, otherwise the operations can continue by recording (block 1228) user data and other information contained in the message to, for example, document what content has been provided to the UE 300. The content server 1210 obtains (block 1230) that content, which as explained above may include an application, authorization information to activate an operational feature, a movie, music, game, promotional information, discount coupon, etc. The content is communicated (block 1232) to the user equipment 300.

Depending upon characteristics of the received content, the UE 300 may install (block 1234) an application, game, background image, such as an image displayed as background in the display device 326 of the UE 300. The UE 300 may use data read from the NFC circuit 110 to set, change, or defined features of the application. The UE may activate (block 1236) an operational feature provided by executable program code and/or may activate content that resides in or is downloaded to the UE 300. The UE may play (block 1238) a movie, music, or other multimedia content that is downloaded and/or streamed from the content server 1210.

Other communications may occur between the point of sale terminal 1200 and the content server 1210, and/or between the content server 1210 and the user equipment 300 during the operations of blocks 1220-1238 and/or in addition to those operations to control access to and use of the content by the UE 300.

Figure 13:
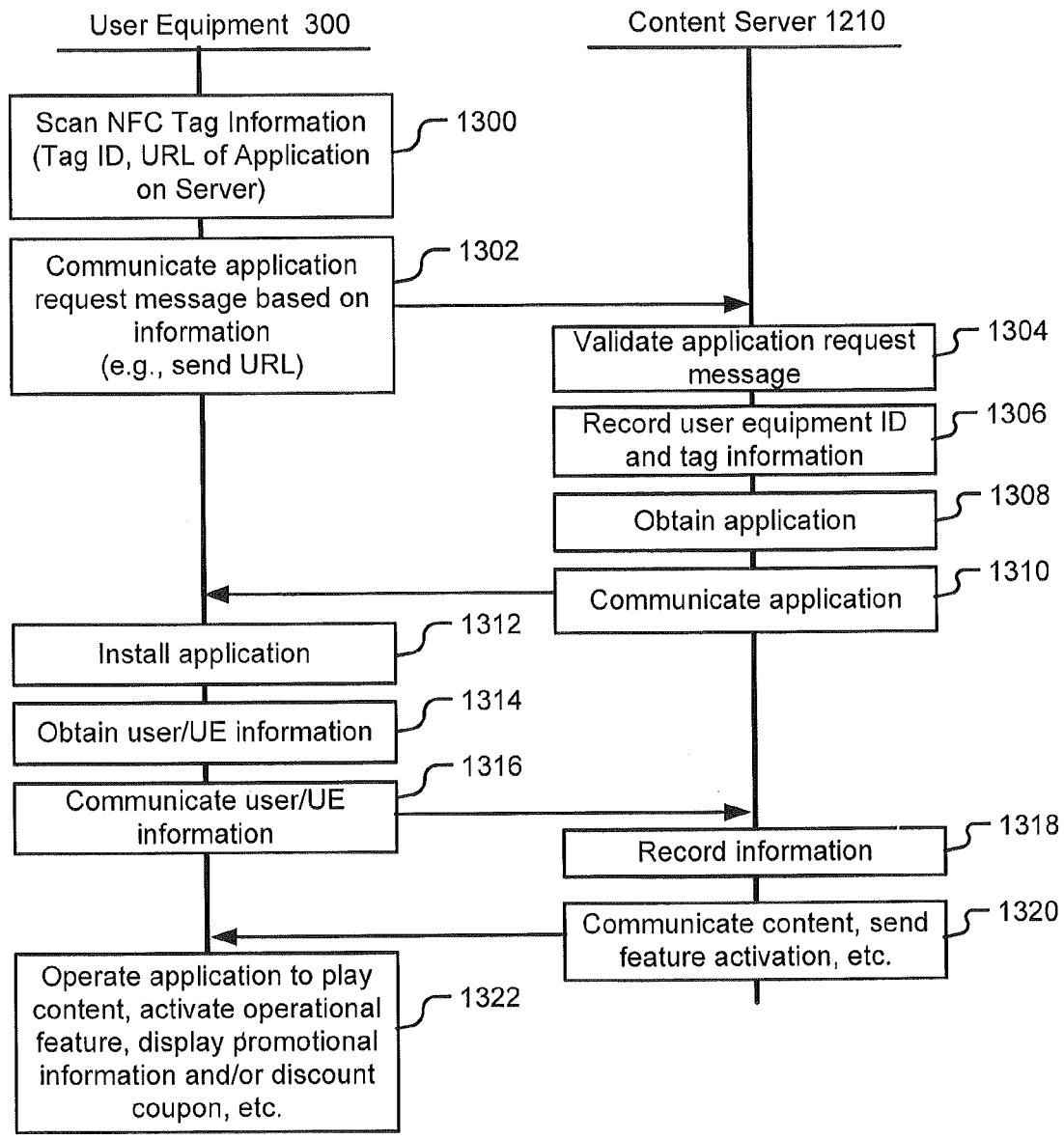
FIG. 13 illustrates a data flow diagram and flowchart of operations that can be performed by a user equipment and a server to obtain and use information from an accessory NFC circuit to provide an application, operational feature, and/or other content to the user equipment.

Controlling Application Installation and Content Operation Using NFC Enabled Accessories FIG. 13 illustrates a data flow diagram and flowchart of operations that can be performed by a UE 300 and a content server 1210 to obtain and use information from an accessory NFC circuit to provide an application, operational feature, and/or other content to the UE 300.

Referring to FIG. 13, the UE 300 is operated to scan (block 1300) the NFC tag to obtain information therefrom. The UE 300 communicates (block 1302) an application request message based on the information from the NFC tag. The application request message may contain a URL to an application stored on the content server 1210.

The content server 1210 may validate (block 1304) information in the application request message to confirm that the UE 300 is authorized to receive an application. If the information is not properly validated the operations can cease, otherwise the operations can continue by recording (block 1306) a UE ID and/or information from the NFC tag to, for example, document what application will be provided to which UE. The content server 1210 obtains (block 1308) the application. The application is communicated (block 1310) to the user equipment 300 (e.g., downloaded from an applications store).

The UE 300 installs (block 1312) and executes the application. Features of the application may be set, changed, or defined based on the content, such as to request location tracking, request access to user contact information, request access to communication interface(s), etc. The application obtains (block 1314) information relating to the user, the UE 300 (e.g., user login or other credentials, user name and/or contact information, unique UE identifier, etc.), and/or relating to a unique identifier obtained from the NFC tag, and communicates (block 1316) the information to the content server 1210. The content server 1210 can record (block 1318) the information and use the information to confirm that the UE 300 is authorized to receive content (e.g., hash the received information and compare to expected value) and to select among available content to be provided to the UE 300. The content server 1210 communicates (block 1320) the content to the UE 300.

Depending upon characteristics of the received content, the application executed by the UE 300 can play the content (movie, music, game, multimedia content, etc.), use the content to activate an operational feature of the application, display a background image contained in the content (e.g., an image displayed as background in the display device 326 of the UE 300), display an electronic book contained in the content, display promotional information contained in the content, display a discount coupon contained in the content, etc.

One or more of the operations of blocks 1300-1322 may be performed once during initial downloading and playing of the content, or may be repetitively performed in response to each attempt by a user to play or otherwise use content through the UE 300. For example, operations of blocks 1300-1322 may be used to download and play a movie through an application on the UE 300, and then at least some of the operations of blocks 1300-1322 may be repeated when a user attempts to re-play the movie to confirm that NFC tag information is readable at that time. Thus, for example, a user may cease having authorization to play or otherwise use content when the NFC enabled cover is removed from the UE 300. The user may regain authorization to play or otherwise use content by reinstalling/attaching the NFC enabled cover to the UE 300 so that the NFC tag information can be properly scanned and used to enable use of the content. The NFC enabled cover or other accessory may thereby operate as a key that must be readable by the UE 300 to obtain continuing use of content.

Other communications may occur between the content server 1210 and the user equipment 300 during the operations of blocks 1300-1322 and/or in addition to those operations to control access to and use of the content by the UE 300.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:
1. An apparatus comprising:
  a near field communication (NFC) circuit comprising:
    an antenna configured to inductively couple to signals emitted by another NFC circuit;
    a charging circuit configured to output power provided by the inductive coupling through the antenna to the signals emitted by the other NFC circuit; and a transceiver circuit configured to be powered by the charging circuit to transmit data for receipt by the other NFC circuit; and
an electrically conductive layer that is removable from being on the NFC circuit, and while the electrically conductive layer is on the NFC circuit the electrically conductive layer prevents the transceiver circuit from transmitting,
wherein the electrically conductive layer comprises a removable conductive sticker that electrically connects to one or more locations on the antenna, to a ground plane of the NFC circuit, and/or to another circuit node of the NFC circuit to prevent the transceiver circuit from transmitting.

2. The apparatus of claim 1, wherein:
the removable conductive sticker electrically connects to two spaced apart locations on the antenna to short-circuit the antenna between the two spaced apart locations and render the antenna inoperable for receiving sufficient power from the signals emitted by the other NFC circuit to prevent operational powering of the transceiver circuit.

3. The apparatus of claim 1, wherein:
the antenna is covered by a protective layer that is electrically non-conductive and has at least one via hole that exposes at least one contact at one or more locations on the antenna, a ground plane of the NFC circuit, and/or another circuit node of the NFC circuit; and
the removable conductive sticker electrically connects through the at least one via hole to the exposed at least one contact.

4. The apparatus of claim 3, wherein:
the protective layer has a pair of spaced apart via holes that expose a pair of contacts at spaced apart locations on the antenna; and
the removable conductive sticker electrically connects through the pair of spaced apart via holes to the pair of contacts to short-circuit the antenna extending between the pair of contacts and render the antenna inoperable for receiving sufficient power from the signals emitted by the other NFC circuit to prevent operational powering of the transceiver circuit.

5. The apparatus of claim 1, wherein:
the removable conductive sticker electrically shorts an output of the charging circuit to ground to prevent power from the inductive coupling through the antenna to the signals emitted by the other NFC circuit from operationally powering the transceiver circuit.

6. The apparatus of claim 1, wherein:
the removable conductive sticker comprises metal mesh wiring, a metal layer, or a metal line.

7. An apparatus comprising:
a near field communication (NFC) circuit comprising:
an antenna configured to inductively couple to signals emitted by another NFC circuit;
a charging circuit configured to output power provided by the inductive coupling through the antenna to the signals emitted by the other NFC circuit; and
a transceiver circuit configured to be powered by the charging circuit to transmit data for receipt by the other NFC circuit; and
an electrically conductive layer that is removable from being on the NFC circuit, and while the electrically conductive layer is on the NFC circuit the electrically conductive layer prevents the transceiver circuit from transmitting,
wherein the electrically conductive layer comprises a removable conductive sticker having metal mesh wiring or a metal layer, the electrically conductive layer is removably attachable to cover at least the antenna of the NFC circuit to shield the antenna from signals emitted by another NFC circuit.

8. The apparatus of claim 7, wherein:
the NFC circuit comprises a protective layer that is electrically non-conductive has a via hole that exposes contact on a ground plane of the NFC circuit; and
the metal mesh wiring or the metal layer of the removable conductive sticker electrically connects through the via hole to the exposed contact on the ground plane.

9. An apparatus comprising:
a near field communication (NFC) circuit comprising:
an antenna configured to inductively couple to signals emitted by another NFC circuit;
a charging circuit configured to output power provided by the inductive coupling through the antenna to the signals emitted by the other NFC circuit; and
a transceiver circuit configured to be powered by the charging circuit to transmit data for receipt by the other NFC circuit; and
an electrically conductive layer that is removable from being on the NFC circuit, and while the electrically conductive layer is on the NFC circuit the electrically conductive layer prevents the transceiver circuit from transmitting,
wherein the electrically conductive layer comprises a portion of a switch that is actuated by a user to selectively electrically interconnect two or more nodes in the antenna, a ground plane of the NFC circuit, a charging circuit, and/or a transceiver circuit of the NFC circuit.

10. An apparatus comprising:
a near field communication (NFC) circuit comprising:
an antenna configured to inductively couple to signals emitted by another NFC circuit;
a charging circuit configured to output power provided by the inductive coupling through the antenna to the signals emitted by the other NFC circuit; and
a transceiver circuit configured to be powered by the charging circuit to transmit data for receipt by the other NFC circuit; and
an electrically conductive layer that is removable from being on the NFC circuit, and while the electrically conductive layer is on the NFC circuit the electrically conductive layer prevents the transceiver circuit from transmitting,
wherein the electrically conductive layer comprises a conductive bag in which the NFC circuit can be removably placed, the conductive bag comprising metal mesh wiring and/or a metal layer that shields the antenna from signals emitted by another NFC circuit to prevent operational powering of the transceiver circuit.

11. An accessory for a user equipment, the accessory comprising:
a housing that is connectable to the user equipment; and
a near field communication (NFC) circuit attached to the housing, the NFC circuit comprising:
an antenna configured to inductively couple to signals emitted by another NFC circuit;
a charging circuit configured to output power provided by the inductive coupling through the antenna to the signals emitted by the other NFC circuit; and
a transceiver circuit configured to be powered by the charging circuit to transmit data for receipt by the other NFC circuit; and an electrically conductive layer that is removable from being on the NFC circuit, and while the electrically conductive layer is on the NFC circuit the electrically conductive layer prevents the transceiver circuit from transmitting, wherein the electrically conductive layer comprises a removable conductive sticker that electrically connects to one or more locations on the antenna, to a ground plane of the NFC circuit, and/or to another circuit node of the NFC circuit to prevent the transceiver circuit from transmitting.

12. The accessory of claim 11, wherein:
the housing comprises a cover configured to protect a surface of the user equipment and/or a stand that supports and holds the user equipment in a defined orientation.

13. The accessory of claim 11, wherein:
the removable conductive sticker electrically connects to two spaced apart locations on the antenna to short-circuit the antenna between the two spaced apart locations and render the antenna inoperable for receiving sufficient power from the signals emitted by the other NFC circuit to prevent operational powering of the transceiver circuit.

14. The accessory of claim 11, wherein:
the antenna is covered by a protective layer that is electrically non-conductive and has at least one via hole that exposes at least one contact at one or more locations on the antenna, a ground plane of the NFC circuit, and/or another circuit node of the NFC circuit; and
the removable conductive sticker electrically connects through the at least one via hole to the exposed at least one contact.

15. The accessory of claim 14, wherein:
the protective layer has a pair of spaced apart via holes that expose a pair of contacts at spaced apart locations on the antenna; and
the removable conductive sticker electrically connects through the pair of spaced apart via holes to the pair of contacts to short-circuit the antenna extending between the pair of contacts and render the antenna inoperable for receiving sufficient power from the signals emitted by the other NFC circuit to prevent operational powering of the transceiver circuit.

16. The accessory of claim 11, wherein:
the removable conductive sticker electrically shorts an output of the charging circuit to ground to prevent power from the inductive coupling through the antenna to the signals emitted by the other NFC circuit from operationally powering the transceiver circuit.

17. The accessory of claim 1, wherein:
the removable conductive sticker comprises metal mesh wiring, a metal layer, or a metal line.

18. An accessory for a user equipment, the accessory comprising:
a housing that is connectable to the user equipment; and
a near field communication (NFC) circuit attached to the housing, the NFC circuit comprising:
an antenna configured to inductively couple to signals emitted by another NFC circuit;
a charging circuit configured to output power provided by the inductive coupling through the antenna to the signals emitted by the other NFC circuit; and
a transceiver circuit configured to be powered by the charging circuit to transmit data for receipt by the other NFC circuit; and
an electrically conductive layer that is removable from being on the NFC circuit, and while the electrically conductive layer is on the NFC circuit the electrically conductive layer prevents the transceiver circuit from transmitting,
wherein the electrically conductive layer comprises a removable conductive sticker having metal mesh wiring or a metal layer, the electrically conductive layer is removably attachable to cover at least the antenna of the NFC circuit to shield the antenna from signals emitted by another NFC circuit.

19. The accessory of claim 18, wherein:
the NFC circuit comprises a protective layer that is electrically non-conductive has a via hole that exposes contact on a ground plane of the NFC circuit; and
the metal mesh wiring or the metal layer of the removable conductive sticker electrically connects through the via hole to the exposed contact on the ground plane.

20. An accessory for a user equipment, the accessory comprising:
a housing that is connectable to the user equipment; and
a near field communication (NFC) circuit attached to the housing, the NFC circuit comprising:
an antenna configured to inductively couple to signals emitted by another NFC circuit;
a charging circuit configured to output power provided by the inductive coupling through the antenna to the signals emitted by the other NFC circuit; and
a transceiver circuit configured to be powered by the charging circuit to transmit data for receipt by the other NFC circuit; and
an electrically conductive layer that is removable from being on the NFC circuit, and while the electrically conductive layer is on the NFC circuit the electrically conductive layer prevents the transceiver circuit from transmitting,
wherein the electrically conductive layer comprises a portion of a switch that is actuated by a user to selectively electrically interconnect two or more nodes in the antenna, a ground plane of the NFC circuit, a charging circuit, and/or a transceiver circuit of the NFC circuit.

21. An accessory for a user equipment, the accessory comprising:
a housing that is connectable to the user equipment; and
a near field communication (NFC) circuit attached to the housing, the NFC circuit comprising:
an antenna configured to inductively couple to signals emitted by another NFC circuit;
a charging circuit configured to output power provided by the inductive coupling through the antenna to the signals emitted by the other NFC circuit; and
a transceiver circuit configured to be powered by the charging circuit to transmit data for receipt by the other NFC circuit; and
an electrically conductive layer that is removable from being on the NFC circuit, and while the electrically conductive layer is on the NFC circuit the electrically conductive layer prevents the transceiver circuit from transmitting,
wherein the electrically conductive layer comprises a conductive bag in which the NFC circuit can be removably placed, the conductive bag comprising metal mesh wiring and/or a metal layer that shields the antenna from signals emitted by another NFC circuit to prevent operational powering of the transceiver circuit.

* * * * *